Dec. 8, 1936.　　　　E. V. MYERS　　　　2,063,823

VEHICLE LICENSE PLATE OR THE LIKE

Filed June 3, 1930

INVENTOR

Eugene V. Myers,

By Attorneys,

Patented Dec. 8, 1936

2,063,823

UNITED STATES PATENT OFFICE 2,063,823

VEHICLE LICENSE PLATE OR THE LIKE

Eugene V. Myers, East Orange, N. J.

Application June 3, 1930, Serial No. 459,037

4 Claims. (Cl. 40—125)

The present invention is directed to devices affecting or controlling the use of motor cars and other vehicles, the object being to minimize accidents.

One of the leading ideas in connection with the invention is to provide means whereby the driving record of automobile users will be carried about by the car in plain sight. In dealing with so difficult a question as safe motor car driving, the present invention takes advantage of the very salutary effects produced by the pressure of public opinion. It also includes means to facilitate the action of traffic officers and traffic courts in dealing with offenders, by enabling them to ascertain previous records of the driver of a motor car by mere inspection.

To this end, the invention in its preferred form comprises a license plate having a series of removable elements which are adapted to be eliminated, one or more for each offense or conviction. Such removable elements preferably take the form of what might be called coupons, or sections of a license plate, which are designed to be removed by suitably constituted authorities at each offense of the driver. The best form is that of an ordinary license plate having metallic extensions formed integrally with the plate, provided with weakened lines whereby the coupons may be removed by the properly constituted authorities, in accordance with the number and gravity of the offenses.

Practically all civilized countries use license plates formed of metal or other wear-resisting, water-resisting material, which each motorist is compelled to carry upon his car. These materials make admirable vehicles for the device of my invention, since the removable parts will be then equally wear-resisting and prominent until bodily removed.

Ordinarily, it will be sufficient for public safety purposes, that a driver's record for the current year will be considered, so that at the beginning of each year a fresh license plate will be issued to the driver, irrespective of his record for the previous year. But if desired that a complete record of the driver shall be carried, this can be easily done, according to the present invention, by compelling each driver, on application for new plates, to return his old plates, whereupon the removable sections of each can be similarly destroyed on the new plates.

According to a further improvement, the invention contemplates that each removable section shall bear the number of the license plate, which may be returned to a central office, such as that of the motor vehicle commissioner in any State, whereby, if an application is made by a driver for new plates on the ground that some of the coupons or other removable sections have been inadvertently, accidentally or maliciously removed, this statement will be capable of being verified by the commissioner or analogous officer, and if found truthful, new plates or licenses issued.

In the accompanying drawing, which is illustrative of the invention—

Figure 1:
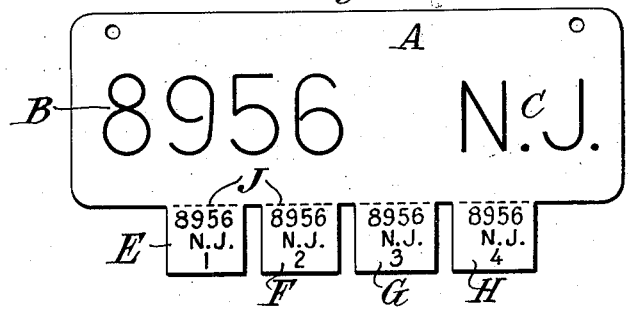
Figure 1 is an illustration of one form of the invention, wherein the invention is applied to license plates wherein the coupons are arranged below the body of the plate.

As to Figure 1 of the drawing, let A indicate any usual license plate such as are commonly issued by the various States. The letter B indicates the number of the car license. The letters C indicate the State. At the bottom of the plate are a series of coupons E, F, G and H. Preferably, these coupons are formed integrally with the metal of the plate, and each is joined to the plate at its top by a weakened line J. The connected metal left after the weakening process should be such as to produce a firm connection, but preferably is not so strong as to prevent removal by hand. Preferably, each of the coupons E, F, G, H, contains the number of the license and the State which issues it. Preferably, also, each of the coupons is itself numbered.

When there is an infraction of the traffic laws (either with or without court proceedings) the traffic officer or the proper officer of the court will remove one or more of the coupons. The result will be that after such infraction the driver will be compelled to drive (if at all) with a plate which shows exactly what his driving record is.

If in applying the present invention any State should provide that upon the loss of all the coupons the car license should be cancelled, the public at large, and traffic officers and magistrates in particular, can tell at a glance the exact driving record of the car operator and how near he is to complete cancellation of his license. This carrying of one's driving record around permanently on his car is believed to be of great importance, in that public opinion will be directed to any driver whose license plates show infractions of the traffic laws. Furthermore, any traffic officer, on perceiving a violation, can immediately determine whether he is dealing with a careful driver or one with a bad driving record. Furthermore, it is believed that even reckless drivers who have committed severe infractions of the traffic law, or who have had several convictions, will be very much more careful in their driving, particularly when there stands between them and the cancellation of their licenses perhaps only one more chance, as evidenced by a single coupon.

By preference, the individual coupons E, F, G and H are separately numbered, as for instance, by the numerals 1, 2, 3 and 4, as shown.

Preferably, also, each of the coupons bears the same number as the license plate, as is shown in Fig. 1. If one or more of the coupons are, hence, removed, by a proper authority and sent to some central office or offices of the State, it will be very easy to check up upon any claim of a driver that he has lost some of the coupons through accident or malice. It is recognized that malicious or thoughtless persons, such as children or some one inimical to a driver, might deliberately remove one or all of the coupons. But such central office, by reason of the return of legally removed coupons, will be able to check up on any such claim by a driver, and if found correct can easily replace the plates so maliciously tampered with, removing, if necessary, at the same time the number of coupons which have been legally taken from the plates. The weakened lines between the coupons and the plates preferably leave the metal in such condition that young and thoughtless children will not have the strength to remove them.

The number of coupons attached to a plate is a matter of choice and will depend, preferably, upon the character of the State law or municipal law which governs the matter. If such a law provides that any traffic officer shall have the power to give the driver his choice between losing a coupon or taking a summons to appear in court and running the chance of conviction which might result in the removal of more than one, then the number of coupons may be increased. But it is quite within the invention to provide two series of indexes such as coupons, one for removal by traffic officers for minor infractions and the loss of which has one (or no) effect upon the driver's license and the other of which is adapted to be removed by court order upon conviction and which has a different effect.

So, also, it is possible, in place of coupons, to provide any readily removable sections, even to the extent of official punching of readily removable portions of the license plates. But it is very desirable that the plate shall be so mutilated under the conditions of infraction of laws, that it shall plainly and openly carry the driver's record in a manner to be discernible at a reasonably short distance from the car and at night, and in a manner to admit of no repair.

It will be understood that while the simplest form of the invention, and one which would ordinarily be employed, is a single, integral, license plate having removable portions,—such, for instance, as is shown and described,—it is within the invention to use a plate structure comprising two parts mounted either contiguously or separately, so long as the complete structure thus formed carries the necessary elements set forth in the claims, and one part is provided with integrally attached, readily removable sections for the purpose described.

Figure 2:
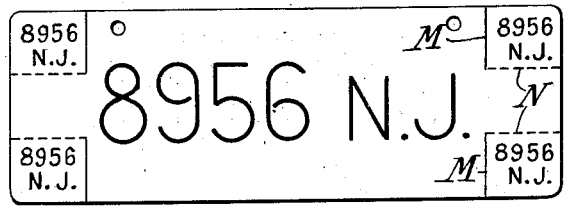
Figure 2 is a similar view, wherein the coupons are arranged at corners of the plate.

In Figure 2 the coupons are arranged in the corners, and in order to facilitate removal, the plate is slit through at portions M and weakened at portions N.

Figure 3:
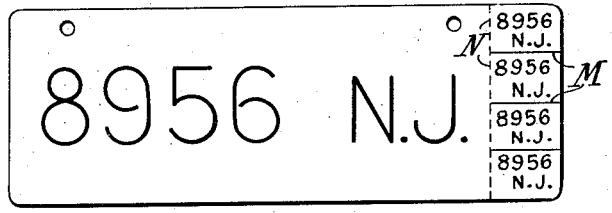
Figure 3 is a similar view, wherein the coupons are arranged at the ends of the plate.

The same thing is true of Figure 3, wherein the coupons are arranged at the end of the plate.

What I claim is:

1. A license plate for vehicles, comprising a hard weather-resisting plate adapted for attachment to the exterior of a motor vehicle, and said plate having a main section carrying official indicia of the government issuing the plate and index of the particular plate, such as a number, and said main section having integrally attached thereto readily removable sections to constitute by their presence or official absence a driving record.

2. A license plate for vehicles, comprising a hard weather-resisting plate adapted for attachment to the exterior of a motor vehicle, and said plate having a main section carrying official indicia of the government issuing the plate and index of the particular plate, such as a number, and said main section having integrally attached thereto readily removable sections to constitute by their presence or official absence a driving record, and each of said removable sections having sufficient indicia corresponding to that on the main plate to determine from the removed sections what is the main section.

3. A license plate for vehicles formed of stiff metal and adapted to be secured to the exterior of a motor vehicle, said license plate comprising a main section having on its face indicia of the government issuing it and identifying indicia, such as a number, and said plate having integral sections adapted for ready removal and constituting by their presence or official absence a driving record.

4. A license plate for vehicles formed of stiff metal and adapted to be secured to the exterior of a motor vehicle, said license plate comprising a main section having on its face indicia of the government issuing it and identifying indicia, such as a number, and said plate having integral sections adapted for ready removal and constituting by their presence or official absence a driving record, said readily removable sections each having sufficient indicia to identify them with the plate from which they are removed.

EUGENE V. MYERS.

CERTIFICATE OF CORRECTION.

Patent No. 2,063,823.                                December 8, 1936.

EUGENE V. MYERS.

It is hereby certified that error appears in the printed specification of the above numbered patent requiring correction as follows: Page 1, first column, line 50-51, for the word "destroyed" read removed; and that the said Letters Patent should be read with this correction therein that the same may conform to the record of the case in the Patent Office.

Signed and sealed this 16th day of February, A. D. 1937.

(Seal)

Henry Van Arsdale
Acting Commissioner of Patents.